United States Patent [19]

Lobeck

[11] 4,395,142
[45] Jul. 26, 1983

[54] SELF-ADJUSTING ANGULAR CONTACT SPHERICAL BEARING

[75] Inventor: John H. Lobeck, South Bend, Ind.

[73] Assignee: The Torrington Company, Torrington, Conn.

[21] Appl. No.: 245,180

[22] Filed: Mar. 18, 1981

[51] Int. Cl.³ .............................................. F16C 23/04
[52] U.S. Cl. .................................... 384/192; 384/300
[58] Field of Search ................. 308/72, 238, DIG. 4, 308/237 A, 237 R, 58, 59; 384/192, 300, 108, 145, 146, 213

[56] References Cited

U.S. PATENT DOCUMENTS 3,893,736  7/1975  McCloskey ........................... 308/72
3,989,322  11/1976  McCloskey ........................... 308/72
4,024,616  5/1977  McCloskey ........................... 308/72

*Primary Examiner*—Lenard A. Footland
*Attorney, Agent, or Firm*—F. S. Troidl

[57] ABSTRACT

The spherical bearing has an outer race with a curved indented inner surface. An inner race support is provided with an annular channel having a bottom surface tapering toward the axis of the support from one side of the channel to the other side of the channel. The inner race is fitted within the channel. The inner race has an inner surface complementary with the bottom surface of the channel and an outer surface complementary with the curved indented inner surface of the outer race.

2 Claims, 1 Drawing Figure

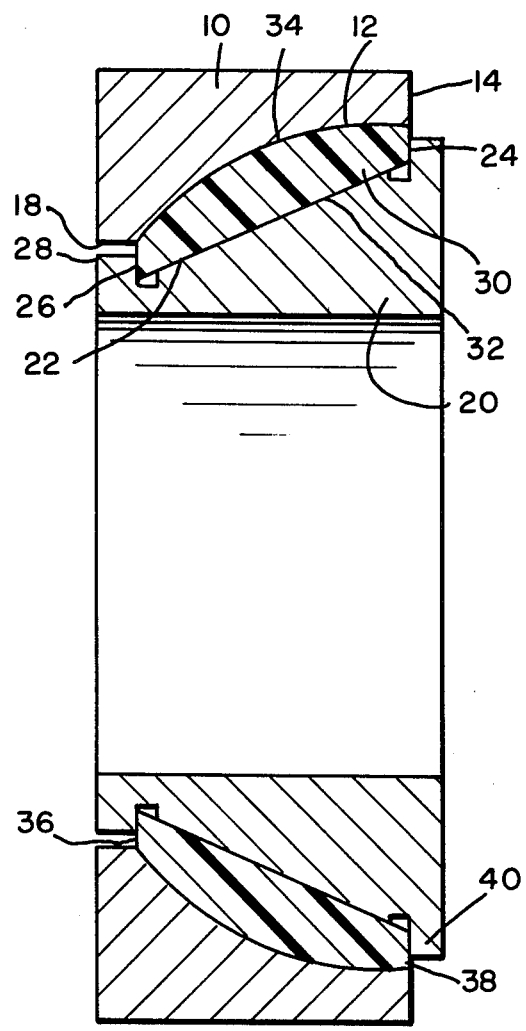

SELF-ADJUSTING ANGULAR CONTACT SPHERICAL BEARING

This invention relates to bearings. More particularly, this invention is a new, self-adjusting, angular contact spherical bearing.

Angular contact spherical bearings have sphered, sliding contact surfaces which are at an angle to the bearing axis. These bearings are suitable for combined radial and axial loads but can take axial loads in one direction only. A combination of two angular contact spherical bearings having a common load center can accommodate heavy radial loads and heavy axial loads in both directions.

Angular contact spherical bearings exist with the sliding contact surfaces including a self-lubricating liner on the outer race. Since the liner is molded to the outer race, it has only one wear surface. Once wear takes place, the liner and the outer race must be discarded and replaced with a new liner and outer race.

The U.S. Pat. No. 3,893,736 issued July 8, 1975 to Albert R. McCloskey discloses a spherical bearing in which the inner member includes at least three interlocked, spherical segments. The spherical segments may be coated with polytetrafluoroethylene.

The structure of the spool in the McCloskey Patent is such that it is necessary for the self-lubricating material to be made of segments. The performance of the McCloskey bearing is highly dependent upon a perfect bond between the segments. This requires considerable skill not normally available for field replacement.

My new invention is an angular contact, self-adjusting spherical bearing which includes an annular liner made of self-lubricating material such as polytetrafluoroethylene. The liner is a one-piece liner. The liner is mounted on a support which is constructed so that the one-piece liner may be easily assembled. When the one-piece liner wears, it is easily replaced. The owner need not buy a new outer race or new support.

The invention, as well as its many advantages, may be further understood by reference to the following detailed description and single FIGURE which is a sectional, elevational view of a preferred embodiment of my new self-adjusting, angular contact spherical bearing.

Referring to the FIGURE, my new bearing includes an annular outer race 10 having a curved indented or generally concave inner surface 12 generally tapering inwardly from one axial end of the outer race toward the other end. The surface 12 is entirely around the inside of the outer race 10 and extends longitudinally from the radially extending annular surface 14 of the outer race 10 to coaxial annular surface 18.

The annular one piece support 20 is provided with an annular channel. The bottom surface 22 of the annular channel is inclined or tapers toward the axis of the bearing from the side 24 of the annular channel to the side 26 of the annular channel. Annular flange 28 of support 20 is radially spaced from the annular surface 18 on outer race 10.

A plastic liner 30, made of a self-lubricating material, such as polytetrafluoroethylene, is snapped into the annular channel in support 20. The plastic liner is a single, annular plastic liner.

The inner annular surface 32 of the plastic liner 30 is also inclined and is shaped to be complementary with the bottom surface 22 of the annular channel on support 20. The outer surface 34 of the liner 30 is generally convex and is complementary with the concave or curved indented inner surface 12 of the outer race 10.

The radial surface 36 of the liner extends radially outwardly further from the axis of the bearing than the annular flange 28 on support 20, and the radial surface 38 of the liner 30 extends radially outwardly slightly further than the annular flange 40 on support 20. Thus, the sliding contact surface 12 on outer race 10 only has sliding contact with the self-lubricating material liner 30 which serves as the inner race.

The outer race 10 and inner race, or plastic liner 30, are relatively movable and the plastic liner 30 and support 20 are relatively movable. Therefore, if proper relative movement of the outer race 10 with respect to liner 30 is prevented, for example, by corrosion, dirt, or the like, relative movement of the liner 30 with respect to the support 20 will occur to provide proper alignment.

If the plastic liner 30 becomes worn in the field, only the plastic liner need be removed and replaced. It is not necessary to buy a new outer race or new inner support.

I claim:

1. A spherical bearing comprising: an outer race having a curved, indented inner surface generally tapering inwardly from one axial end of the outer race toward the other end; a one piece support having an annular channel, the bottom surface of the annular channel tapering toward the axis of the support from one side of the annular channel to the other side of the annular channel and in the same direction as the curved, indented inner surface of the outer race; and a single removable annular plastic liner snap fitted within said annular channel, and having an inner surface complementary with the bottom surface of the annular channel and an outer surface complementary with the curved, indented inner surface of the outer race.

2. A spherical bearing in accordance with claim 1 wherein: the plastic liner is made of self-lubricating material.

* * * * *